(12) United States Patent
Stamato et al.

(10) Patent No.: US 11,831,219 B2
(45) Date of Patent: Nov. 28, 2023

(54) ROTOR FOR ELECTRIC MOTOR, PARTICULARLY FOR TRACTION, AND RELATED ELECTRIC MOTOR

(71) Applicant: MARELLI EUROPE S.P.A., Corbetta (IT)

(72) Inventors: Salvatore Stamato, Corbetta (IT); Francesco Leli, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 32 days.

(21) Appl. No.: 17/475,254

(22) Filed: Sep. 14, 2021

(65) Prior Publication Data

US 2022/0085689 A1 Mar. 17, 2022

(30) Foreign Application Priority Data

Sep. 16, 2020 (IT) .......................... 102020000021841

(51) Int. Cl.
*H02K 7/00* (2006.01)
*H02K 1/276* (2022.01)
*H02K 7/075* (2006.01)

(52) U.S. Cl.
CPC ............. *H02K 7/003* (2013.01); *H02K 1/276* (2013.01); *H02K 7/075* (2013.01)

(58) Field of Classification Search
CPC ......... H02K 7/075; H02K 1/276; H02K 7/003
USPC ................................ 310/80, 216.51, 216.86
See application file for complete search history.

(56) References Cited

FOREIGN PATENT DOCUMENTS

| CN | 108400664 A | 8/2018 |
| DE | 102017011989 A1 | 6/2018 |
| EP | 2538523 A1 | 12/2012 |
| JP | 2013106406 A | 5/2013 |
| JP | 2015080305 A | 4/2015 |
| JP | 2016005307 A | 1/2016 |
| JP | 2019126168 A | 7/2019 |

OTHER PUBLICATIONS

Machine translation of Kanashige et al. JP2013106406, May 2013.*
Search Report for Italian Patent Application No. 102020000021841 dated Jun. 1, 2021.

* cited by examiner

*Primary Examiner* — Terrance L Kenerly
(74) *Attorney, Agent, or Firm* — Howard & Howard Attorneys PLLC

(57) ABSTRACT

A rotor for an electric motor comprising a crankshaft extending along an axis (X-X) coinciding with an axis of rotation of the crankshaft, and at least one steel plate having slots for housing magnets. The steel plate includes a central seat, keyed to an outer side wall of the crankshaft according to an interference coupling, wherein the steel plate is coupled to the crankshaft at the central seat by a first tooth obtained on the steel plate, which projects towards the associated crankshaft and a first radial seat, obtained on the outer side wall of the crankshaft. The first radial seat has an isosceles trapezium cross-section delimited laterally by a pair of oblique sides converging towards the axis of rotation. The first tooth has a 'V' cross-section with a pair of curvilinear side walls, suitable for interfacing against the oblique sides of the first radial seat.

19 Claims, 5 Drawing Sheets

ROTOR FOR ELECTRIC MOTOR, PARTICULARLY FOR TRACTION, AND RELATED ELECTRIC MOTOR

CROSS-REFERENCE TO RELATED APPLICATIONS

The present application claims priority to and all the benefits of Italian Patent Application No. 102020000021841, filed on Sep. 16, 2020, which is hereby expressly incorporated herein by reference in its entirety.

BACKGROUND OF THE INVENTION

1. Field of the Invention

This invention relates to an improved rotor for an electric motor, particularly for traction, and a related electric motor.

2. Description of the Related Art

In the automotive sector, and in particular in electric traction motors, it is known to make rotors comprising a crankshaft on which stacks of ferromagnetic steel plates are keyed. The steel plates interact with magnets arranged on the stator of the electric motor in order to generate torque on the crankshaft to be typically used for traction.

The mechanical coupling between the crankshaft and the steel plates is an extremely critical element of the electric motor.

In fact, in the traction sector, the crankshafts of electric motors may reach extremely high rotation speeds, on the order of 20,000 rpm, often transmitting considerable torque.

It is obvious that such rotational speeds and torques (and therefore transmission powers) put a strain on all the components and in particular on the mechanical couplings between the shaft and the steel plates.

It must be pointed out that, in high-performance electric motors, any related angular misalignment between the crankshaft and the steel plate stacks must be avoided, as the performance of such motors, especially in terms of torque, would degrade rapidly, especially in the case of electric motors designed with a certain 'skewing' angle, i.e., with an angular stagger of the steel plates, moving between the front or anterior wall towards the rear of the rotor.

Therefore, it is necessary to provide a mechanical coupling between the shaft and the steel plates that is repeatable on the assembly line and that always ensures a connection integral in rotation (i.e., without mutual angular misalignment) between the shaft and the steel plates in all motor operating conditions (torque, angular speed, and temperature, which may vary greatly).

For this purpose, a forced, i.e., interference (press-fit) coupling between the steel plate stacks and the central seat of the crankshaft is known. This forced coupling is able to ensure the absence of related angular misalignment only for crankshaft rotation speeds that are not too high.

However, when rotational speeds increase and/or the torques involved are high, the use of a press-fit coupling between the shaft and the steel plate stacks may no longer prevent the occurrence of significant (and damaging) angular misalignment between the shaft and the steel plate stacks.

In addition, the operation of the electric motor is particularly difficult in case of torque reversals, which are extremely frequent in traction applications. It is necessary to maintain continuous contact between the shaft and the rotor stack during torque reversals and a minimum angular movement may lead to incorrect readings by the corresponding speed sensor (resolver) and therefore a non-optimal operation of the electric motor.

For this reason, certain solutions with shape couplings between the steel plate stacks and the electric motor rotor are known in the related art. These known shape couplings are however not always able to ensure adequate performance especially when, in addition to high speeds and torques, thermal stresses due to overheating of the motor are added.

SUMMARY OF THE INVENTION

Thus, there is a need in the art to resolve the cited drawbacks and limitations in reference to the prior art.

This requirement is satisfied by an improved rotor for an electric motor comprising a crankshaft extending along a main extension axis (X-X) coinciding with a rotation axis of the crankshaft, and at least one steel plate including slots for housing magnets. The steel plate has a central housing, keyed onto an outer side wall of the crankshaft according to an interference coupling, wherein the steel plate is coupled to the crankshaft, at the central seat, by shape coupling. The shape coupling includes a first tooth made on the steel plate, which protrudes towards the associable crankshaft and a first radial seat, made on the outer side wall of the crankshaft, so as to house radially the first tooth, at least partially. The first radial seat has an isosceles trapezium cross-section, with respect to a cross-section plane extending perpendicular to the axis of rotation. The isosceles trapezium is delimited laterally by a pair of oblique sides converging towards the axis of rotation. The first tooth has a 'V' shaped cross-section with a pair of curvilinear side walls, interfacing in abutment against the oblique sides of the first radial seat. The present invention is also directed toward a related electric motor comprising a rotor, and a stator arranged coaxial to the rotor.

Other embodiments of this invention are described in the dependent claims.

BRIEF DESCRIPTION OF THE DRAWINGS

Further features and advantages of this invention will become more apparent from the following detailed description of preferred, non-limiting embodiments thereof, wherein.

Figure 1:
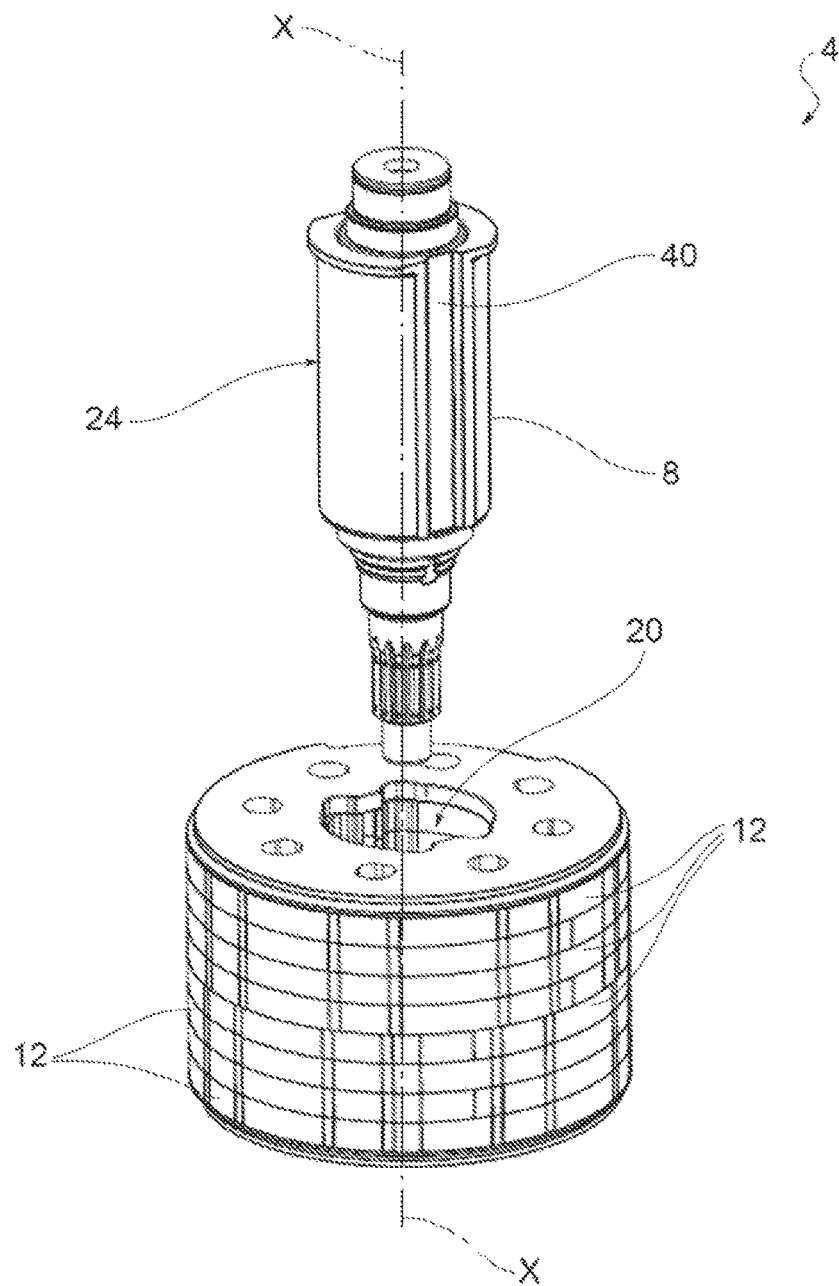
FIG. 1 is an exploded perspective view of an electric motor rotor according to an embodiment of this invention.
Figure 2:
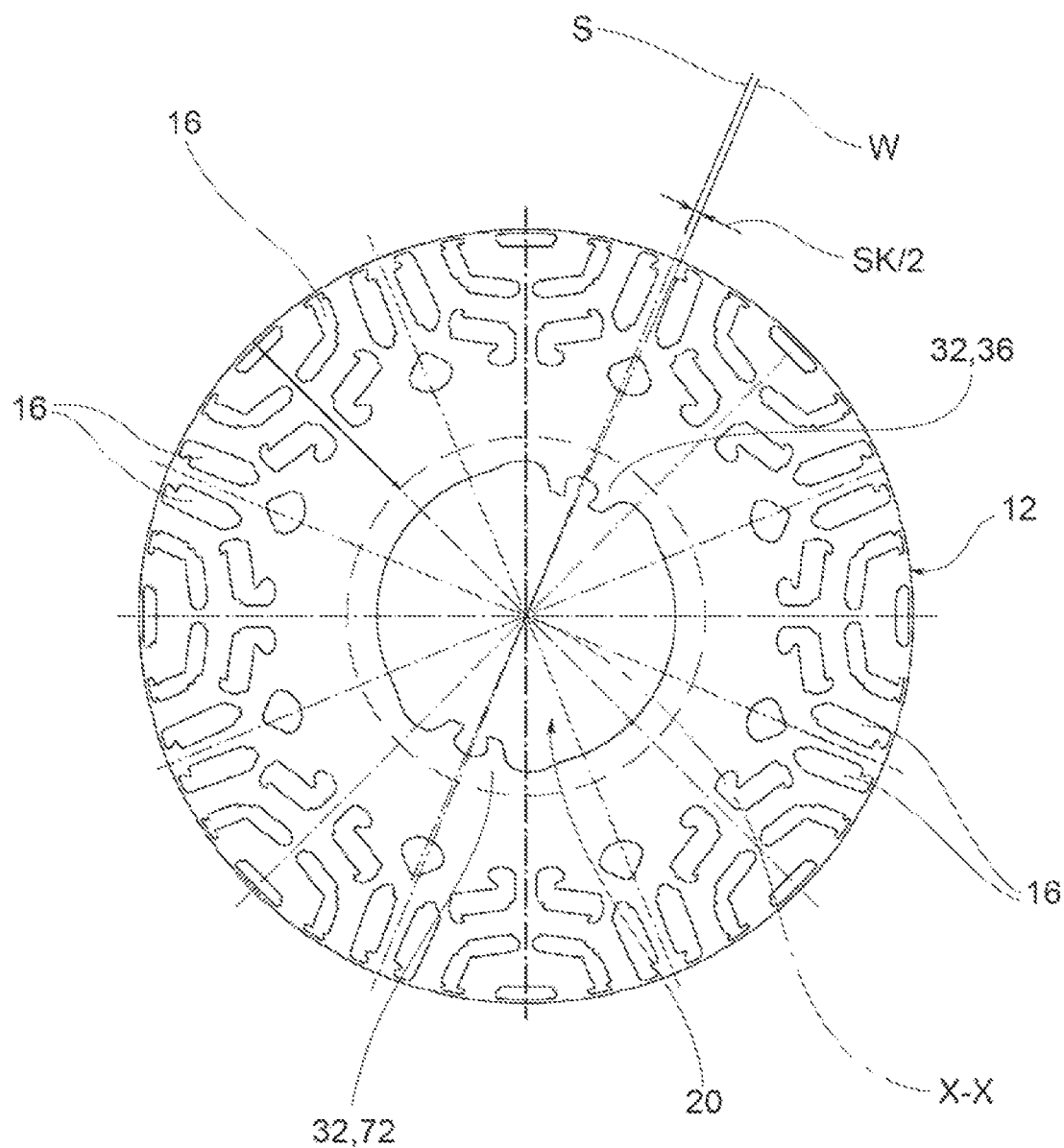
FIG. 2 is a plan view of a keyed steel plate on the crankshaft of the rotor in FIG. 1.
Figure 3:
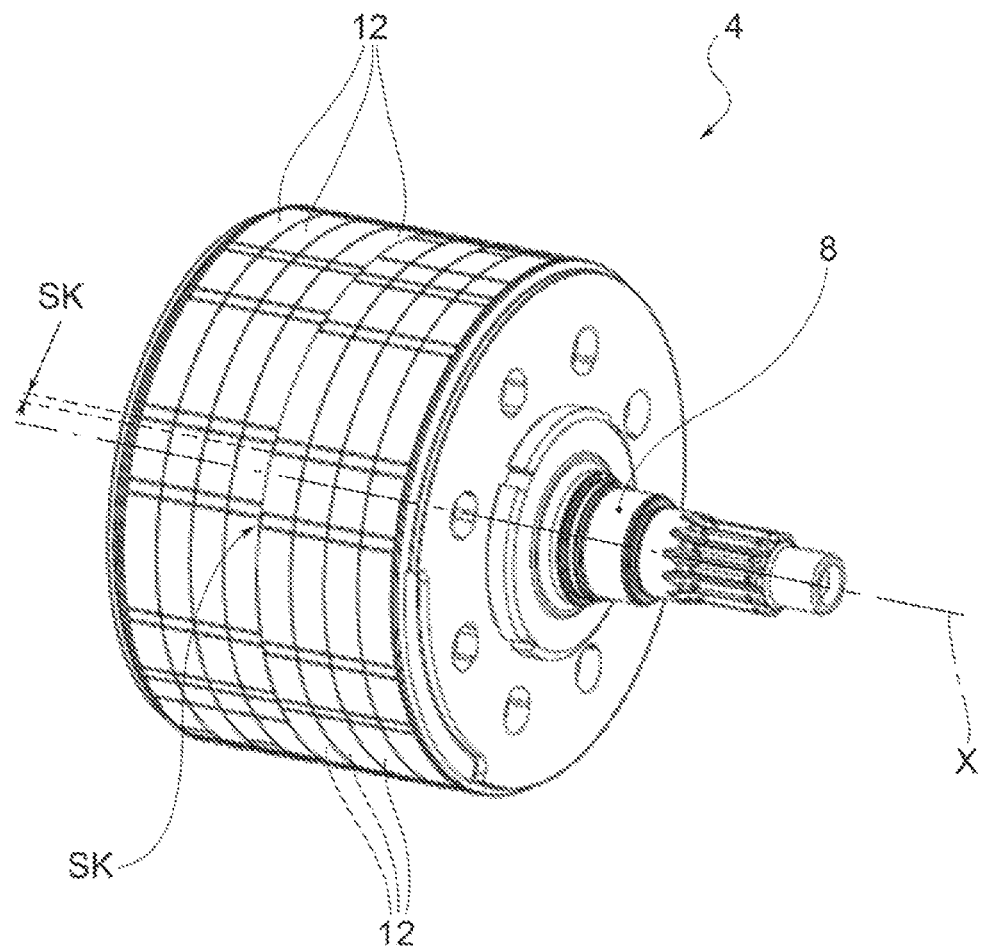
FIG. 3 is a perspective view, in assembly configuration, of the electric motor rotor in FIG. 1.
Figure 4:
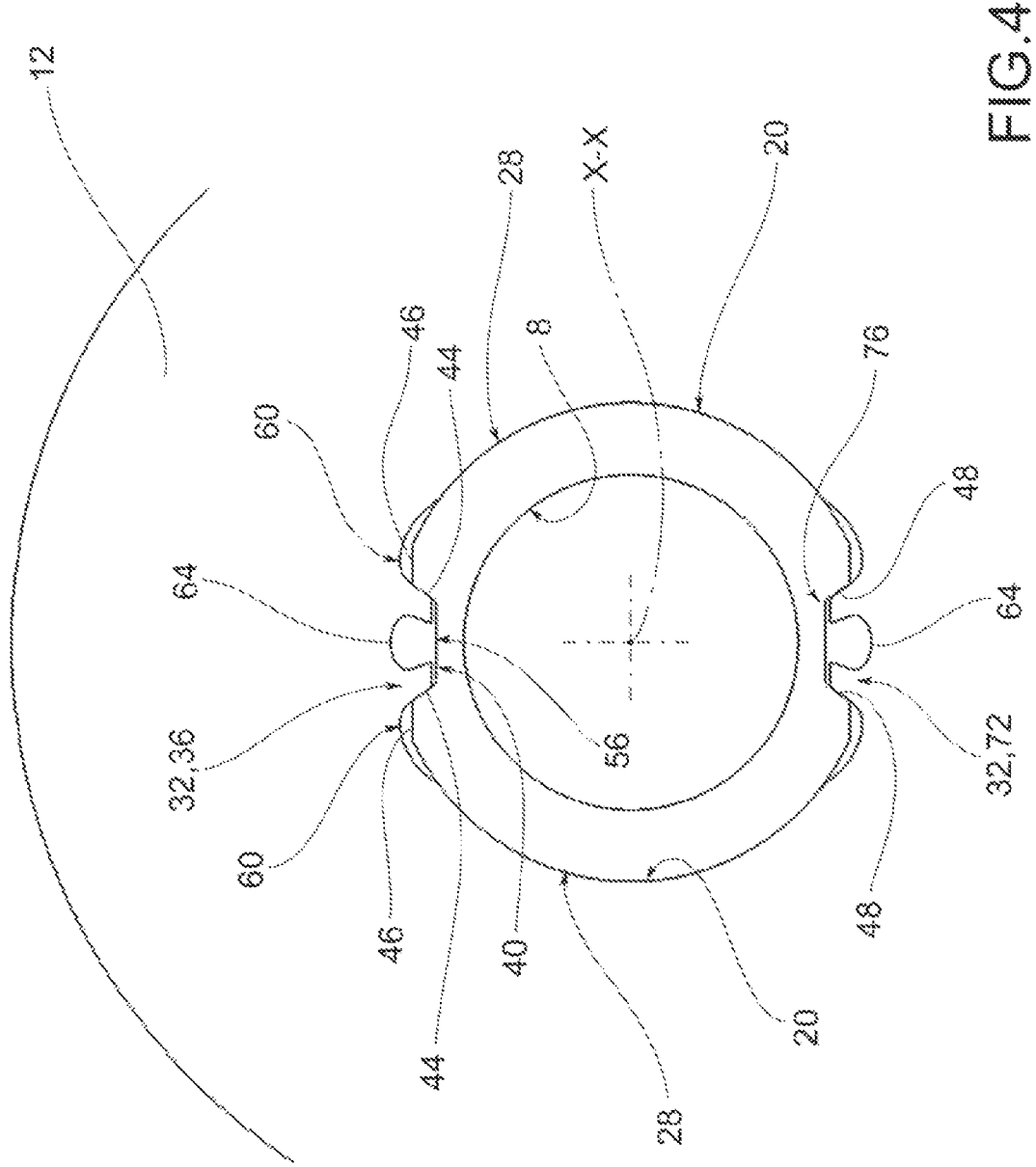
FIG. 4 is a cross-sectional view of a coupling between a steel plate and the crankshaft in FIG. 1.
Figure 5:
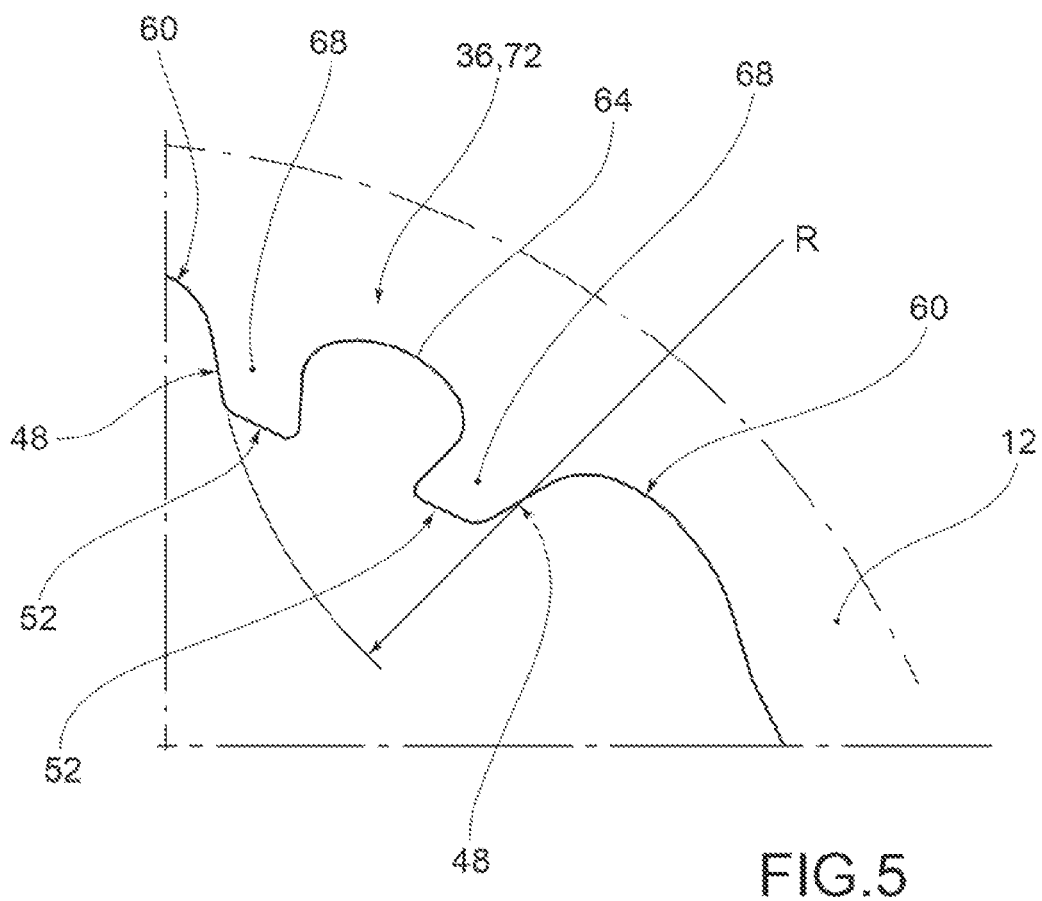
FIGS. 5 and 6 are enlarged details of the geometry of a coupling tooth of the steel plate on the crankshaft, according to an embodiment of this invention.
Figure 6:
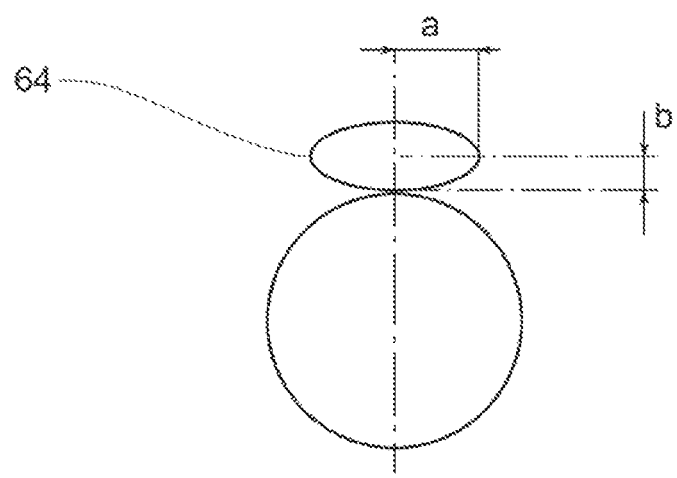

Elements or parts of elements common to the embodiments described hereinafter will be indicated with the same numerical references.

DETAILED DESCRIPTION OF THE INVENTION

With reference to the aforesaid figures, 4 refers globally to a rotor of an electric motor, particularly for the automotive sector.

The rotor is in turn housed at least partially coaxially with respect to a stator (not shown) in a known manner.

It should be noted that the application of this invention to the automotive sector is preferential, but not exclusive, since the electric motor may have various fields of use.

The rotor 4 comprises a crankshaft 8 extending along a prevailing extension axis X-X coinciding with an axis of rotation of the crankshaft 8, and at least one steel plate 12 provided with slots 16 for housing magnets and a central seat 20 keyed to an outer side wall 24 of the crankshaft 8 according to an interference coupling.

For example, the interference coupling involves a pair of angular portions 28 in mutual contact between the outer side wall 24 of the crankshaft 8 and the central housing 20 arranged at diametrically opposite positions with respect to the axis of rotation of the rotor 4.

In one embodiment, the rotor 4 comprises a plurality of steel plates 12, preferably having the same axial thickness, arranged aligned axially, i.e., along the prevailing extension axis X-X.

In one embodiment, the steel plates 12 are identical to each other and have the same number of slots 16 having the same geometry and angular arrangement with respect to the axis of rotation. In this way the magnets may be housed in corresponding slots 16 of steel plates 12 adjacent to each other.

Each steel plate 12 is coupled to the crankshaft 8, at said central seat 20, by a shape coupling 32.

Advantageously, the shape coupling 32 may include a first tooth 36 formed on the steel plate 12, which projects towards the associated crankshaft 8 and a first radial seat 40, formed on the outer side wall 24 of the crankshaft 8, so as to radially accommodate the first tooth 36, at least partially.

In one embodiment, the first radial seat 40 extends continuously on the outer side wall 24 of the crankshaft 8 so as to intercept the first teeth 36 of a plurality of steel plates 12 placed side by side along the prevailing extension axis X-X.

Advantageously, the first radial seat 40 has an isosceles trapezium cross-section with respect to a cross-section plane perpendicular to the axis of rotation. The isosceles trapezium is delimited laterally by a pair of oblique sides 44 converging toward the axis of rotation (but not necessarily with the directrices coinciding with the axis).

In one embodiment, the first radial seat 40 is delimited in height, in the radial direction, by a pair of flattenings 46 that reduce the outer diameter of the crankshaft 8 so as to avoid direct contact with the associated steel plate 12.

Similarly, the first tooth 36 has a 'V' cross-section having a pair of curvilinear side walls 48, suitable for interfacing in abutment against said oblique sides 44 of the first radial seat 40.

Preferably, the oblique sides 44 of the first radial seat 40 are flat and the curvilinear side walls 48 of the first tooth 36 are circular.

In one embodiment, the circular walls of the first tooth have a curvature radius of at least 10 mm.

According to an embodiment, the 'V' cross-section of the first tooth 36 has a radial chamfer 52 on the side of the axis of rotation, at a cantilevered radial end of the first tooth 36. The cantilevered radial end therefore identifies a radial clearance with a bottom 56 of the first radial seat 40.

According to a possible embodiment, the first tooth 36, at each connection zone between the steel plate 12 and one of the curvilinear side walls 48, has a radial recess 60 extending from opposite sides of the associated crankshaft 8.

The radial recess 60 constitutes an additional radial clearance with respect to said flattenings 46 on the outer side wall 24 of the crankshaft 8.

According to a possible embodiment, the first tooth 36 comprises a central recess 64 that subdivides each first tooth 36 into a pair of fins 68 arranged symmetrically with respect to the central recess 64.

In one embodiment, the central recess 64, with respect to a cross-section plane perpendicular to the axis of rotation, has an elliptical cross-section, in which a major axis 'a' of the ellipse is oriented tangentially, i.e., perpendicular to a radial direction passing through the axis of rotation, and a minor axis 'b' of the ellipse is oriented along the radial direction.

In one embodiment, the ratio of the major axis 'a' to the minor axis 'b' of the ellipse is greater than or equal to 2.

In one embodiment, the central recess 64 is open or through to the associated first radial seat 40. This increases the controlled flexion of said fins 68 divided by the central recess, during the transmission of the torque.

In one embodiment, the coupling between the first tooth 36 and the first radial seat 40 is of the interference type.

The interference coupling occurs, in particular, at the contact between the curvilinear side walls 48 of the first tooth 36 and the oblique sides 44 of the first radial seat 40.

Preferably, the shape coupling 32 includes a second tooth 72 formed on the steel plate 12, which is projected towards the associated crankshaft 8, and a second radial seat 76 formed on the outer side wall 24 of the crankshaft 8, so as to radially accommodate the second tooth 72, at least partially.

Advantageously, the second tooth 72 and the second radial seat 76 are arranged diametrically opposite to the first tooth 36 and the first radial seat 40 with respect to the axis of rotation of the crankshaft 8.

In one embodiment, the second tooth 72 has the same geometry and size as the first tooth 36, and the second radial seat 76 has the same geometry as the first radial seat 40.

In one embodiment, the shape coupling between each tooth 36, 72 and the associated radial seat 40, 76 is of the interference type, wherein the coupling between the second tooth 72 and the second radial seat 76 provides for less or no interference than that provided between the first tooth 36 and the first radial seat 40.

According to one embodiment, the steel plate 12 has an angular stagger between an axis of assembly symmetry S-S, passing through said first tooth 36 and second tooth 72, and an axis of magnetic symmetry W-W of said steel plate 12. The angular stagger allows an overall double stagger or 'skew' SK, to be obtained between steel plates 12 identical to each other but mounted after 180° rotation on said crankshaft 8.

In this configuration, the major axis 'a' of the central recess 64 identifies, with the radial direction, passing through the axis of rotation, an angle equal to 90 degrees±the angular stagger between the axis of assembly symmetry S-S and the axis of magnetic symmetry W-W of the steel plate 12.

The method of coupling and related operation of a rotor improved according to this invention will now be described.

In particular, since the interference on the diameter between the crankshaft 8 and the central seat 20 of the plate is not excessive, the rotor 4 may be assembled:
- by cooling only the crankshaft 8;
- by heating only the steel plate stack 12;
- at room temperature directly with press-fit.

It should be noted that by cooling the crankshaft 8, the shape of the radial seat 40, 76 allows for more "clearance" or play to achieve a more precise tooth assembly 36, 72.

As far as the operation is concerned, at high speed (e.g., 20000 rpm), the diameter of the crankshaft 8 "detaches" with respect to the steel plate 12. Therefore, the only contact to prevent reciprocal rotation between the crankshaft 8 and the steel plate stack 12 is the teeth 36, 72.

Thus, torque is transmitted, at low rotational speeds, with interference on the diameter of the crankshaft 8, while at medium to high rotational speeds, through the tooth or teeth with their respective radial seats.

The 'V' geometry of the tooth allows for auto-centering when returning from high to low rotation speeds of the crankshaft 8.

Stress on the first and/or second tooth 36, 72 in torque transmission is kept low by the geometric plane/sphere contact. The plane is given by the sloping surface of the oblique sides 44 delimiting the radial seats 40, 76 of the crankshaft 8, while the sphere is given by the radius of the curved side walls 48 of each tooth 36, 72 of the steel plate 12.

An advantageous condition requires, as seen, that such curvilinear side walls 48 exhibit a radius R>=10 mm.

In this way the contact is precise, but the mechanical stress is not excessive.

The central recess 64 on the tooth 36, 72 is made to give more flexibility to the tooth and is elliptical in geometry to behave better in the centrifugal forces during the rotation of the crankshaft 8.

The ratio of the semiaxes of the ellipse preferably should be a/b>=2.

As may be appreciated from that which is described, this invention overcomes the drawbacks of the prior art.

In particular, the rotor makes it possible to avoid any relative angular misalignment between the steel plate stacks and the crankshaft, even under heavy-duty working conditions, i.e., at high speed/torque and with frequent reversals of the rotation direction.

More specifically, for low rotation speeds, torque transmission occurs by friction between the external side wall of the crankshaft and the central seat of the steel plate stack, while for high rotation speeds it occurs due to the action of the teeth engaged in their respective radial seats.

The specific geometry of the teeth on the one hand avoids any mutual angular misalignment at high speeds and on the other hand allows self-centering when the rotation speed is decreasing.

In addition, the geometry of the tooth and of the walls of the radial seats make it possible to obtain a geometric contact that reduces the specific contact pressure to within acceptable values, in order to ensure long life of the components.

The use of two teeth that are identical but diametrically opposed to each other allows the desired skew between keyed steel plate stacks, rotated 180°, on said crankshaft to be obtained quickly and economically.

A person skilled in the art, in order to satisfy contingent and specific needs, may make numerous modifications and variations to the solutions described above, these modifications and variations all being contained within the scope of the invention as defined in the following claims.

The invention claimed is:

1. A rotor for an electric motor comprising:
    a crankshaft extending along a main extension axis (X-X) coinciding with a rotation axis of the crankshaft,
    at least one steel plate including slots for housing magnets, the steel plate having a central housing, keyed onto an outer side wall of the crankshaft according to an interference coupling,
    wherein the steel plate is coupled to the crankshaft, at said central seat, by shape coupling,
    wherein said shape coupling includes a first tooth made on the steel plate, which protrudes towards the associable crankshaft and a first radial seat, made on said outer side wall of the crankshaft, so as to house radially said first tooth, at least partially, and wherein the first tooth comprises a central recess which divides said first tooth into a pair of fins arranged symmetrically with respect to said central recess,
    wherein the first radial seat has an isosceles trapezium cross-section, with respect to a cross-section plane extending perpendicular to said axis of rotation, said isosceles trapezium being delimited laterally by a pair of oblique sides converging towards the axis of rotation,
    wherein the first tooth has a 'V' shaped cross-section with a pair of curvilinear side walls, interfacing in abutment against said oblique sides of the first radial seat.

2. The rotor for an electric motor as set forth in claim 1, wherein said oblique sides of the first seat are flat and said curvilinear side walls of the first tooth are circular.

3. The rotor for an electric motor as set forth in claim 2, wherein said circular walls of the first tooth have a radius of curvature of at least 10 mm.

4. The rotor for an electric motor as set forth in claim 1, wherein the first radial seat is delimited in height, in a radial direction, by a pair of flattenings which reduce the outer diameter of the crankshaft so as to avoid direct contact with the associated steel plate.

5. The rotor for an electric motor as set forth in claim 1, wherein said 'V' cross-section of the first tooth has a radial chamfer on the side of the axis of rotation, at a radial cantilevered end of the first tooth, said radial cantilevered end identifying a radial clearance with a bottom of the first seat.

6. The rotor for an electric motor as set forth in claim 1, wherein the first tooth, at each connection zone between the steel plate and one of said curved side walls, has a radial recess extending on the opposite side to the associable crankshaft.

7. The rotor for an electric motor as set forth in claim 1, wherein said central recess, with respect to a cross-section plane perpendicular to the axis of rotation, has an elliptical cross-section, wherein a major axis (a) of the ellipse is oriented tangentially, perpendicular to a radial direction passing through the axis of rotation, and a minor axis (b) of the ellipse is oriented along said radial direction.

8. The rotor for an electric motor as set forth in claim 7, wherein a ratio between the major axis (a) and minor axis (b) of the ellipse is greater than or equal to 2.

9. The rotor for an electric motor as set forth in claim 8, wherein the shape coupling includes a second tooth made on the steel plate, which juts out towards the associable crankshaft and a second radial seat, made on said outer side wall of the crankshaft, so as to house radially said second tooth, at least partially, wherein the second tooth and the second radial seat are arranged in a position diametrically opposite the first tooth and the first radial seat with respect to the axis of rotation.

10. The rotor for an electric motor as set forth in claim 9, wherein the second tooth has the same geometry and size as the first tooth and the second radial seat has the same geometry as the first radial seat.

11. The rotor for an electric motor as set forth in claim 9, wherein the shape coupling between each tooth and its radial seat is of the interference type, wherein the coupling between the second tooth and the second radial seat provides a lower clearance or interference than that provided between the first tooth and the first radial seat.

12. The rotor for an electric motor as set forth in claim 9, wherein the plate has an angular stagger between an axis of assembly symmetry (S-S), passing through said first tooth and second tooth, and an axis of magnetic symmetry (W-W) of said steel plate.

13. The rotor for an electric motor as set forth in claim 12, wherein the major axis (a) of the central recess identifies with the radial direction, passing through the axis of rotation, an angle equal to 90 degrees±said angular stagger between the axis of assembly symmetry (S-S) and the axis of magnetic symmetry (W-W) of the steel plate.

14. The rotor for an electric motor as set forth in claim 1, wherein the central recess is open or through towards the associated first radial seat.

15. The rotor for an electric motor as set forth in claim 1, wherein the coupling between the first tooth and the first radial seat is of the interference type.

16. An electric motor comprising a rotor as set forth in claim 1, and a stator arranged coaxial to said rotor.

17. A rotor for an electric motor comprising:
a crankshaft extending along a main extension axis (X-X) coinciding with a rotation axis of the crankshaft,
at least one steel plate including slots for housing magnets, the steel plate having a central housing, keyed onto an outer side wall of the crankshaft according to an interference coupling,
wherein the steel plate is coupled to the crankshaft, at said central seat, by shape coupling,
wherein said shape coupling includes a first tooth made on the steel plate, which protrudes towards the associable crankshaft and a first radial seat, made on said outer side wall of the crankshaft, so as to house radially said first tooth, at least partially,
wherein the first radial seat has an isosceles trapezium cross-section, with respect to a cross-section plane extending perpendicular to said axis of rotation, said isosceles trapezium being delimited laterally by a pair of oblique sides converging towards the axis of rotation, and wherein the first radial seat is delimited in height, in a radial direction, by a pair of flattenings which reduce the outer diameter of the crankshaft so as to avoid direct contact with the associated steel plate,
wherein the first tooth has a 'V' shaped cross-section with a pair of curvilinear side walls, interfacing in abutment against said oblique sides of the first radial seat.

18. A rotor for an electric motor comprising:
a crankshaft extending along a main extension axis (X-X) coinciding with a rotation axis of the crankshaft,
at least one steel plate including slots for housing magnets, the steel plate having a central housing, keyed onto an outer side wall of the crankshaft according to an interference coupling,
wherein the steel plate is coupled to the crankshaft, at said central seat, by shape coupling,
wherein said shape coupling includes a first tooth made on the steel plate, which protrudes towards the associable crankshaft and a first radial seat, made on said outer side wall of the crankshaft, so as to house radially said first tooth, at least partially,
wherein the first radial seat has an isosceles trapezium cross-section, with respect to a cross-section plane extending perpendicular to said axis of rotation, said isosceles trapezium being delimited laterally by a pair of oblique sides converging towards the axis of rotation,
wherein the first tooth has a 'V' shaped cross-section with a pair of curvilinear side walls, interfacing in abutment against said oblique sides of the first radial seat, and the 'V' cross-section of the first tooth has a radial chamfer on the side of the axis of rotation, at a radial cantilevered end of the first tooth, said radial cantilevered end identifying a radial clearance with a bottom of the first seat.

19. A rotor for an electric motor comprising:
a crankshaft extending along a main extension axis (X-X) coinciding with a rotation axis of the crankshaft,
at least one steel plate including slots for housing magnets, the steel plate having a central housing, keyed onto an outer side wall of the crankshaft according to an interference coupling,
wherein the steel plate is coupled to the crankshaft, at said central seat, by shape coupling,
wherein said shape coupling includes a first tooth made on the steel plate, which protrudes towards the associable crankshaft and a first radial seat, made on said outer side wall of the crankshaft, so as to house radially said first tooth, at least partially,
wherein the first radial seat has an isosceles trapezium cross-section, with respect to a cross-section plane extending perpendicular to said axis of rotation, said isosceles trapezium being delimited laterally by a pair of oblique sides converging towards the axis of rotation,
wherein the first tooth has a 'V' shaped cross-section with a pair of curvilinear side walls, interfacing in abutment against said oblique sides of the first radial seat, and the first tooth, at each connection zone between the steel plate and one of said curved side walls, has a radial recess extending on the opposite side to the associable crankshaft.

\* \* \* \* \*